United States Patent [19]

Jacobson et al.

[11] Patent Number: 4,499,829
[45] Date of Patent: Feb. 19, 1985

[54] EXPLOSIVELY SEPARABLE CASING

[75] Inventors: Albin K. Jacobson, Albuquerque, N. Mex.; Raymond E. Rychnovsky; Cornelius N. Visbeck, both of Livermore, Calif.

[73] Assignee: The United States of America as represented by the United States Department of Energy, Washington, D.C.

[21] Appl. No.: 473,177

[22] Filed: Mar. 8, 1983

[51] Int. Cl.³ .......................... F42B 13/38; F42B 4/12
[52] U.S. Cl. ..................................... 102/378; 102/293; 102/340; 102/505
[58] Field of Search ............... 102/293, 340, 342, 351, 102/354, 357, 378, 387, 489, 505; 285/3

[56] References Cited

U.S. PATENT DOCUMENTS

| 3,032,356 | 5/1962 | Botsford | 102/378 |
| 3,715,668 | 2/1973 | Herring et al. | 102/387 |
| 3,797,394 | 3/1974 | Thurston et al. | 102/357 |
| 4,106,875 | 8/1978 | Jewett | 102/378 |

Primary Examiner—Charles T. Jordan
Attorney, Agent, or Firm—James H. Chafin; Albert Sopp

[57] ABSTRACT

An explosively separable casing including a cylindrical afterbody and a circular cover for one end of the afterbody is disclosed. The afterbody has a cylindrical tongue extending longitudinally from one end which is matingly received in a corresponding groove in the cover. The groove is sized to provide a pocket between the end of the tongue and the remainder of the groove so that an explosive can be located therein. A seal is also provided between the tongue and the groove for sealing the pocket from the atmosphere. A frangible holding device is utilized to hold the cover to the afterbody. When the explosive is ignited, the increase in pressure in the pocket causes the cover to be accelerated away from the afterbody. Preferably, the inner wall of the afterbody is in the same plane as the inner wall of the tongue to provide a maximum space for storage in the afterbody and the side wall of the cover is thicker than the side wall of the afterbody so as to provide a sufficiently strong surrounding portion for the pocket in which the explosion takes place. The detonator for the explosive is also located on the cover and is carried away with the cover during separation. The seal is preferably located at the longitudinal end of the tongue and has a chevron cross section.

11 Claims, 5 Drawing Figures

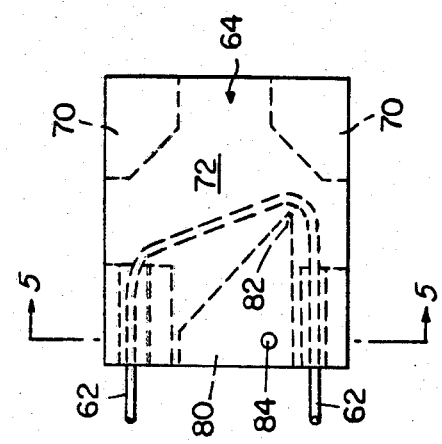
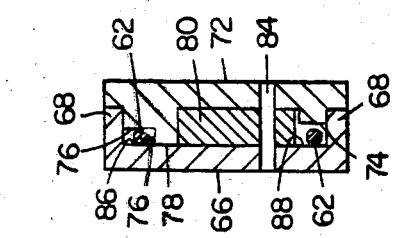
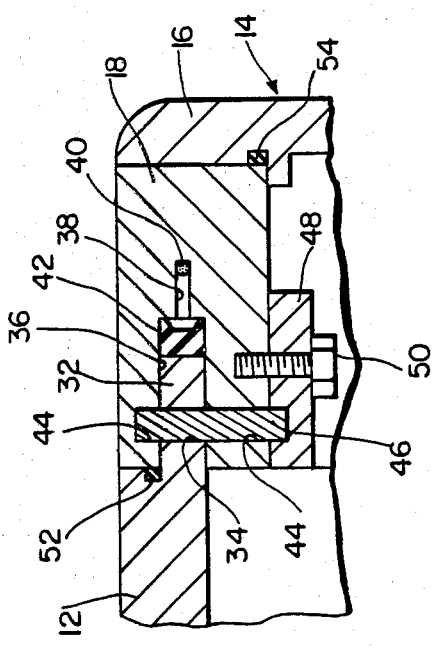
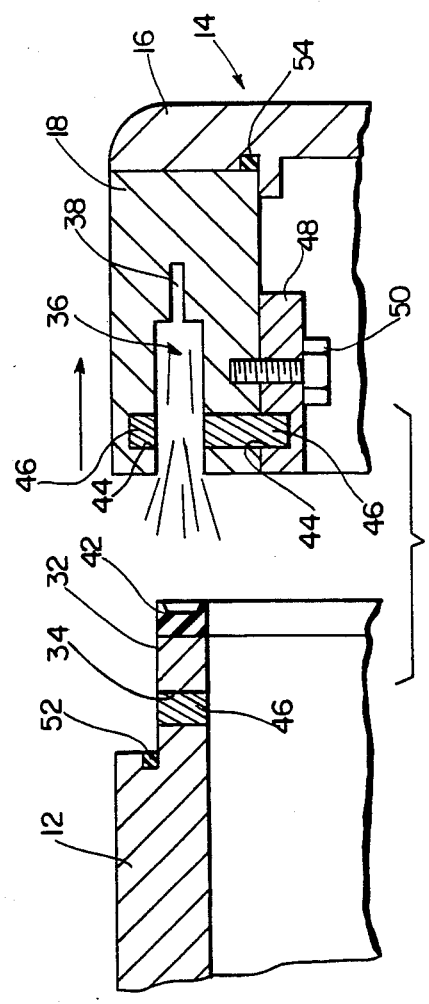

ized casing, and in particular to an explosively separable
EXPLOSIVELY SEPARABLE CASING The U.S. government has rights in this invention pursuant to Contract No. DE-AC04-76DP00789 between the U.S. Department of Energy and AT&T Technologies, Inc.

FIELD OF THE INVENTION

The present invention relates generally to a separable casing, and in particular to an explosively separable casing from which a parachute is deployed.

BACKGROUND OF THE INVENTION

Separable casings or fuselage sections are utilized, for example, in rocketry for jettisoning burned out stages from the payload portion of a rocket or for deployment of a parachute to ease the descent of a store. Ideally, such a separable casing or fuselage section should be operated to provide a reliable separation with only straight line relative movement between the separated portions. Any tumbling movement imparted to either portion may cause damage to the rocket or a malfunction of the parachute deployed.

Disclosed in U.S. Pat. No. 3,032,356 (Botsford) is an explosive means for separating casing members. The device disclosed in this patent includes a tongue extending from the cover into a groove in the afterbody in which the explosive and pressure chamber are located. The tongue and groove arrangement has a metal to metal interface to contain the gases generated by the explosion and consequently the tolerances for these elements has to be closely controlled with a minimum clearance between the interfacing surfaces. It was found that small variations in tolerances changes the quality of the seal produced and changes the velocity of the ejected cover from one assembly to another.

The use of an obturator seal around an artillery shell to prevent the loss of gas pressure during firing of the shell is also known in the prior art. These obturator seals are formed of white rigid plastic and the gas pressure forces the edge of the ring out against the barrel.

SUMMARY OF THE INVENTION

In accordance with the present invention, an explosively separable casing is provided having a cylindrical afterbody and a circular cover. One end of the afterbody is provided with a cylindrical tongue extending therefrom which is matingly received in a portion of a correspondingly sized groove in the cover. The groove also includes a pocket into which the tongue does not extend and in which an explosive is located. A seal means is provided between the tongue and the groove for sealing in the explosive gases generated by the explosive while the cover is moved relative to the afterbody. A frangible holding means holds the cover to the afterbody. When the explosive is ignited, the holding means fails due to the high explosive pressure created in the cavity. The force created by this high pressure accelerates the cover away from the afterbody.

In the preferred embodiment of the present invention, the inner wall of the cylindrical afterbody is in the same plane as the inner wall of the tongue so that a maximum space is provided for a store in the afterbody. In addition, the side wall of the cover in which the groove is located is thicker than the side wall of the afterbody. This design permits the use of a relatively thin-walled afterbody which maximizes the inner diameter of the afterbody while providing a sufficiently strong surrounding for the pocket in which the explosion takes place. The pocket in which the explosion takes place can be smaller than the portion of the groove in which the tongue is located.

Preferably, a detonator for the explosive is provided which is located on the cover. Consequently, the detonator is carried away with the cover and cannot hinder the subsequent deployment of a store such as a parachute from the afterbody. Conveniently, the detonator is electrically actuated by a detonation wire connected to the detonator on the cover and an actuation device in the afterbody. A cutter means is then provided for cutting the wire after detonation of the explosion as the cover is accelerated away from the afterbody. This cutter means is also located on the cover so as not to interfere with subsequent deployment of a store from the afterbody.

In the preferred embodiment, the seal means is a rubber ring having a chevron cross section. The ring is located at the longitudinal end of the tongue and opens toward the pocket. When the explosive is detonated, the edges of the ring seal the inner and outer walls of the groove to contain the explosion gasses in the pocket and groove during acceleration of the cover away from the afterbody. The holding means is preferably a plurality of shear pins which extend radially through the tongue and groove at a number of locations around the casing. These pins are cleanly sheared when the cover is accelerated away from the afterbody due to the explosive force provided by the detonation of the explosive.

It is an advantage of the present invention that the cover is deployed from the afterbody with a high and consistent deployment velocity. It is a further advantage of the present invention that the afterbody is provided with a relatively thin wall and that the maximum diameter available for storing a store is provided.

A further feature is that a clean opening free from protrusions and from rough or sharp edges is provided in the afterbody after the cover has been accelerated away.

Other features and advantages of the present invention are stated in or are apparent from a detailed description of a presently preferred embodiment of the invention found herein below.

BRIEF DESCRIPTION OF THE DRAWINGS

FIG. 2 is an enlarged view of a portion of the casing depicted in cross section in FIG. 1.

FIG. 3 is an enlarged view of the same portion of the casing depicted in FIG. 2, but after explosive separation of the cover and afterbody.

FIG. 4 is top view of a wire cutting device of the present invention.

FIG. 5 is a cross-sectional front view taken along the line 5—5 in FIG. 4.

DETAILED DESCRIPTION OF THE PREFERRED EMBODIMENT

Figure 1:
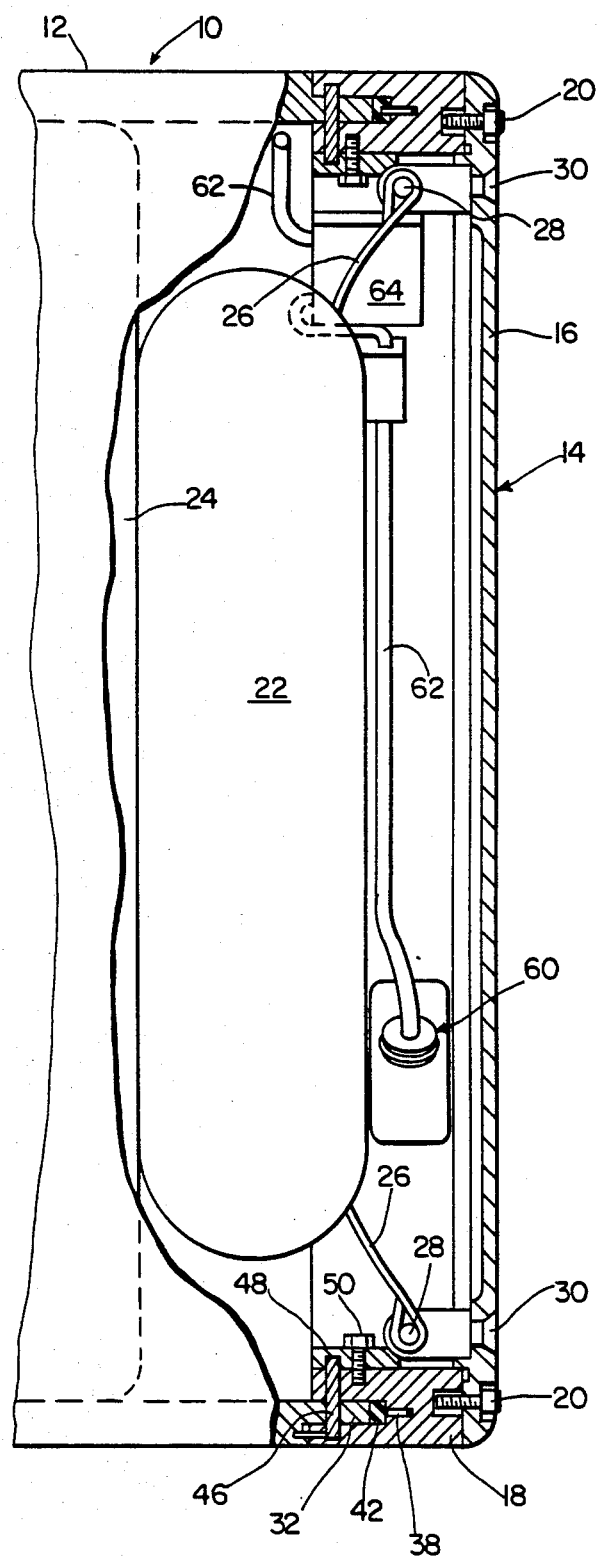
FIG. 1 is a partially cut away sectional side view of a separable casing according to the present invention.

With reference now to the drawings in which like numerals represent like elements throughout the several views, a presently preferred embodiment of an explosively separable casing 10 is depicted in FIG. 1. Casing 10 is generally cylindrically shaped and includes an afterbody 12 and a cover 14 therefor. As shown, cover 14 includes two parts, an end wall 16 and a cylindrical side wall 18. End wall 16 is securely attached to side wall 18 by suitable bolts 20.

In the embodiment defined, separable casing 10 is used to deploy a pilot chute 22 which in turn deploys a main chute 24. Pilot chute 22 is attached by suitable tethers 26 to attachment lugs 28. Attachment lugs 28 are in turn attached by suitable bolts 30 to end wall 16.

As shown in greater detail in FIGS. 2 and 3, the longitudinal end of afterbody 12 is reduced in size and forms an annular tongue 32. The inner wall of tongue 32 is in the same plane as the remainder of the inner wall of afterbody 12 so that a smooth inner wall of afterbody 12 is provided. Provided at intervals around the circumference of tongue 32 are a plurality of radially directed apertures 34.

An annular groove 36 is provided in side wall 18 which matingly receives tongue 32. Groove 36 also includes a reduced portion which forms an annular pocket 38. Located in pocket 38 is a mild detonating fuse explosive 40. Also located in groove 36 at the end of tongue 32 is a seal 42. Seal 42 preferably has a chevron cross section as shown and is made of rubber. A plurality of radially directed apertures 44 are provided in side wall 18 and extend through groove 36. Apertures 44 correspond in number to apertures 34 and align therewith when tongue 32 is inserted in groove 36. Apertures 44 begin at the inner wall of side wall 18.

In order to hold side wall 18 to afterbody 12, a plurality of pins 46 are inserted into apertures 44 and 34 as shown in FIG. 2. In order to retain pins 46 in position, a corresponding plurality of retaining brackets 48 are provided along the inner wall of side wall 18 and brackets 48 are held in place by suitable bolts 50. Pins 46 are made of a suitable frangible metal. Seal rings 52 and 54 are provided between afterbody 12 and side wall 18 and between side wall 18 and end wall 16 to keep dust and the like for the interior of assembled casing 10.

In order to detonate fuse explosive 40, a detonator 60 as shown in FIG. 1 is used. Detonator 60 protrudes from the inside of side wall 18 and is connected to a suitable actuating mechanism located in afterbody 12 by an electrical lead 62. With this construction, detonator 60 and electrical lead 62 are located in cover 14 and are deployed with cover 14. A cutter assembly 64 is also located on the inside of side wall 18 which passively cuts electrical lead 62 as cover 14 separates from afterbody 12. A second detonator 60, electrical lead 62, and cutter assembly 64 (all not shown) are provided on the other half of cover 14.

Cutter assembly 64 is depicted in greater detail in FIGS. 4 and 5. Cutter 64 includes a base 66 with inwardly directed side flanges 68 and spacing flanges 70. Mounted to the inside surface of base 66 is a plate 72 having a short outwardly directed flange 74, a somewhat longer outwardly directed flange 76 on the opposite side, and an adjacent longer flange 78. Located in the space between plate 72 and base 66 is a cutting blade 80 having a rearwardly directed wedge-shaped cutting edge 82. A pin 84 extends through base 66, plate 72, and blade 80. In addition, blade 80 is suitably attached by a first screw (not shown) to base 66 and by a second screw (not shown) to plate 72. Plate 72 is also suitably attached by screws (not shown) to base 66 and cutter assembly 64 is suitably attached by screws (not shown) to side wall 18.

As shown best in FIG. 5, a narrow opening 86 is provided between the end of flange 76 and the top of base 66. Similarly, a larger opening 88 is provided between the end of flange 74 and the top of base 66. Running through opening 88, around edge 82, and through opening 86 is electrical lead 62. As shown best in FIG. 5, electrical lead 62 has an outside diameter which is slightly larger than the height of opening 86. In this manner, electrical lead 62 is positively held in opening 86. In opening 88, electrical lead 62 is freely movable.

In operation, separable casing 10 functions in the following manner. Initially, casing 10 is assembled in the position shown in FIGS. 1 and 2. Then, when it is desired to deploy main chute 24, the actuation device located in afterbody 12 sends an electrical signal through electrical lead 62 to detonator 60. Detonator 60 causes fuse explosive 40 located in pocket 38 to ignite creating an explosive gas. The explosive gas is contained in pocket 38 by chevron seal 42 so that the resulting force of the explosive gas causes pins 46 to be sheared away as shown in FIG. 3. As the explosive gas expands, cover 14 is accelerated off of afterbody 12. The stroke over which the explosive gasses are contained in groove 36 is about one inch and the cover is accelerated during this stroke to a deployment velocity of 80 to 100 feet per second.

It should be noted that detonator 60 and electrical lead 62 are attached to cover 14 and are similarly accelerated away from afterbody 12. As this occurs, the portion of electrical lead 62 contained in the cutter assembly 64 is pulled taut across edge 82 of cutting blade 80 so that electrical lead 62 is cleanly and quickly cut.

As cover 14 continues away from afterbody 12, tethers 26 attached to lugs 28 pull pilot chute 22 out of afterbody 12 and into the air stream behind afterbody 12. Pilot chute 22 then inflates and in turn pulls main chute 24 into the air stream behind afterbody 12 where main chute 24 then inflates.

It should be appreciated that the use of chevron seal 42 provides a good seal for pocket 38 so that both a high and consistent deployment velocity of cover 14 are achieved. Without the use of chevron seal 38, the metal to metal interface of prior art deployment systems resulted in a lower deployment velocity. Even with very close tolerances the deployment velocity varied over a wider range.

It should also be appreciated that the location of explosive 40 and pocket 38 in cover 14, rather than in afterbody 12, provides a configuration of separable casing 10 which maximizes the inside diameter of afterbody 12 in which main chute 24 is located. If pocket 38 were located in afterbody 12, the thickness of afterbody 12 would have to be increased to contain the explosive gasses generated in pocket 38. Instead, with the present invention, only the relatively small portion of side wall 16 of cover 14 is required to have a slightly reduced inside diameter and hence thickness which is sufficient to contain the explosive gasses generated in pocket 38.

It should further be appreciated that the location of detonator 60 and electrical lead 62 on the inner wall of cover 14 causes detonator 60 and electrical lead 62 to be carried away with cover 14. This avoids any potential problem of detonator 60 and electrical lead 62 protruding into the parachute cavity of afterbody 12 and possibly snagging the parachute as it is deployed. In addition, the location of detonator 60 on cover 14 does not limit the size of main chute 24.

The use of the chevron seal also allows the tolerances of the various parts to be increased without any loss in acceptable performance. In fact, relatively rough surfaces in groove 36 are tolerable.

While the present invention has been described with respect to an exemplary embodiment thereof, it will be understood by those of ordinary skill in the art that variations and modifications can be effected within the scope and spirit of the invention. For example, the cross sectional shape of the afterbody 12 and cover side wall 18 may be of any suitable cylindrical shape and need not be circular.

We claim:

1. An explosively separable casing comprising:
    a cylindrical afterbody having a cylindrical tongue extending longitudinally from one end thereof;
    an end cover for said one end of said afterbody, said end cover having a cylindrical side wall in which a cylindrical shaped longitudinal groove is located, a portion of said groove being sized to receive said tongue of said afterbody while leaving a pocket between the end of said tongue and the remainder of said groove;
    an explosive located in said pocket;
    a frangible holding means which normally holds said cover to said afterbody and which fails responsive to an increase in pressure in said pocket to release said cover;
    means for igniting said explosive to cause said increase in pressure in said pocket to cause failure of said frangible holding means; and
    a seal means located between said tongue and said groove for sealing said pocket so as to maintain said increase in pressure within said pocket.

2. A casing as claimed in claim 1 wherein an inner wall of said cylindrical afterbody is in the same plane as the inner wall of said tongue.

3. A casing as claimed in claim 1 wherein said cylindrical side wall of said cover is thicker than the wall of said afterbody so as to maximize the inner cross sectional size of said afterbody for storage of a store while providing a surrounding for the explosion in said pocket in said cover.

4. A casing as claimed in claim 3 wherein said pocket in which said explosive is located is smaller than the portion of said groove in which said tongue is located.

5. A casing as claimed in claim 3 wherein said igniting means includes a detonator located on said cover which is carried away with said cover during separation of said cover from said afterbody.

6. A casing as claimed in claim 5 wherein said igniting means further includes a detonation wire connected to said detonator and to an activation device located in said afterbody, and a cutter means located on said cover for cutting said wire after said explosive is detonated.

7. A casing as claimed in claim 6 wherein said cutter means includes a knife edge over which said wire is routed such that as said cover is accelerated away from said afterbody, said wire is pulled taut over said knife edge and is then subsequently cut by said knife edge.

8. A casing as claimed in claim 1 wherein said seal means is a rubber ring having a chevron cross-section which is located at the longitudinal end of said tongue and which opens toward said pocket to seal the inner and outer walls of said groove.

9. A casing as claimed in claim 8 wherein said pocket in which said explosive is located is smaller than the portion of said groove in which said tongue is located.

10. A casing as claimed in claim 3 wherein said holding means includes a plurality of shear pins which extend radially through both said tongue and said groove and which are spaced around the circumference of said cover such that said pins are cleanly sheared when said cover is accelerated away from said afterbody.

11. A casing as claimed in claim 3 wherein the store is a parachute and a pilot parachute which is connected to said cover by a bridle.

* * * * *